US006712960B2

(12) United States Patent
Freeman (10) Patent No.: US 6,712,960 B2
(45) Date of Patent: Mar. 30, 2004

(54) FILTER FOR FILTERING WATER FOR A PUMP FOR AN AQUARIUM OR A POND

(75) Inventor: James Henry Freeman, Sheerness (GB)

(73) Assignee: Unique Aquatic Life Products Ltd (GB)

( * ) Notice: Subject to any disclaimer, the term of this patent is extended or adjusted under 35 U.S.C. 154(b) by 0 days.

(21) Appl. No.: 10/239,338

(22) PCT Filed: Mar. 16, 2001

(86) PCT No.: PCT/GB01/01169

§ 371 (c)(1),
(2), (4) Date: Sep. 20, 2002

(87) PCT Pub. No.: WO01/70369

PCT Pub. Date: Sep. 27, 2001

(65) Prior Publication Data

US 2003/0019808 A1 Jan. 30, 2003

(30) Foreign Application Priority Data

| Mar. 20, 2000 | (GB) | .............................................. | 0006624 |
| Apr. 20, 2000 | (GB) | .............................................. | 0009841 |
| Jun. 2, 2000 | (GB) | .............................................. | 0013405 |
| Jul. 3, 2000 | (GB) | .............................................. | 0016231 |
| Dec. 19, 2000 | (GB) | .............................................. | 0030852 |

(51) Int. Cl.$^7$ ............................................. A01K 63/04
(52) U.S. Cl. ....................... 210/169; 210/170; 210/748; 210/373; 210/416.2; 210/418; 210/436; 210/472; 119/259
(58) Field of Search ................................ 210/169, 170, 210/748, 416.1, 416.2, 418, 436, 472, 372, 373; 119/259, 261; 15/1.7

(56) References Cited

U.S. PATENT DOCUMENTS

| 3,734,853 | A | * | 5/1973 | Horvath ....................... 210/169 |
| 4,985,146 | A | | 1/1991 | Fox et al. |
| 5,294,335 | A | * | 3/1994 | Chiang ........................ 210/169 |
| 5,582,719 | A | | 12/1996 | Nagano |
| 5,723,044 | A | * | 3/1998 | Gleason et al. ............. 210/170 |
| 6,423,218 | B1 | * | 7/2002 | Lindermeir et al. ........ 210/170 |

FOREIGN PATENT DOCUMENTS

WO      WO 99/40781      8/1999

* cited by examiner

Primary Examiner—Fred G. Prince
(74) Attorney, Agent, or Firm—Iandiorio & Teska (57) ABSTRACT

A filter for filtering water for a pump for an aquarium or a pond, which filter comprises a housing (14), at least one inlet in the housing (14), at least one outlet in the housing (14), at least one filter member (18) in the housing, at least one passageway in the housing (14), and at least one water flow control means; the filter member (18) having a body through which water to be filtered passes to the inside of the filter member (18), and a portion at which filtered water inside the filter member (18) is able to pass to the outlet; and the filter being characterized in that the water flow control means comprises at least one bypass inlet for controlling the water flow, the bypass inlet being such that it firstly controls the water flow direction and velocity as the water enters the bypass inlet, it secondly controls that water flow direction and velocity as the water leaves the bypass inlet, and it thirdly controls the water flow that bypasses the inlet; whereby the filter is such that, in use, the water enters the housing from the inlet at a controlled flow rate which does not attract already separated solids, whereby separated solids settle in the housing and filtered water passes through the filter member to the outlet.

18 Claims, 5 Drawing Sheets

FILTER FOR FILTERING WATER FOR A PUMP FOR AN AQUARIUM OR A POND

This invention relates to a filter for filtering water and, more especially, this invention relates to a filter for filtering water for a pump for an aquarium or a pond.

In order to support healthy fish, it is essential that an aquarium or pond has water of a good quality. The quality of the water determines the amount of fish that are able to live in the aquarium or pond.

There are three basic types of fish keeper, namely the aquarium fish keeper, the domestic/general pond fish keeper, and the professional pond fish keeper. All of these three types of fish keeper have the option of filtering water from mid-water or the bottom of the aquarium or pond.

The aquarium fish keeper has hitherto more specifically had the choice of utilising a mid-water filtration system or an under-gravel filtration system. Known mid-water filtration systems are designed to be installed above the heavier solid waste that settles onto the bottom of the aquarium. The main advantages of the known mid-water filtration systems are that they are easy to install into an existing aquarium, and that they allow easy access for maintenance and cleaning. Their main disadvantage is that the solid waste settles on the bottom of the aquarium, where the solid waste decays and pollutes the water quality. This solid waste is difficult and messy to remove.

The known under-gravel filtration systems available for aquariums have the advantage that they draw the solid and fluid waste from the fish into a gravel bed. Their main disadvantages are that they are difficult to install in an existing aquarium and, when installed, they are difficult and messy to clean and maintain. The solid waste drawn into the gravel bed decays and pollutes the water quality.

For ponds, the pond keeper has hitherto had the choice of filtering water from mid-water in the pond or from the pond bottom. Known mid-water filtration systems are designed to be installed above the heavier clogging solid waste that settles into the pond bottom. Their main advantages are that they are easy to install into existing ponds, and that they allow easy access for maintenance and cleaning. A pre-filter may be fitted to act as a strainer to filter lighter suspended solid waste, and to restrict the entry of small fish. The main disadvantage of the known mid-water filtration systems is that the solid waste settles onto the bottom of the pond, and then decays and pollutes the water quality.

The known pond filtration systems that draw water from the bottom of the pond are such that the pond keeper has the choice of a solid handling pump or a gravity-fed bottom drainage system.

The known solid handling pumps have the advantages of being easy to install into an existing pond, and easy to clean and maintain. Their main disadvantage is that the solid handling pumps break up the solid waste, which is then pumped up to clog external biological filters. Still further, the broken up fine particles pollute the water quality. A pre-filter may be fitted to the solid handling pump to act as a strainer and to restrict the entry of small fish or unwanted solids, but this tends to defeat using a solid handling pump.

The known gravity-fed bottom drainage systems are such that they have the advantage of removing fluid and solid waste from the fish from the bottom of the pond, without breaking up the solid waste into fine particles. The gravity-fed bottom drainage systems have a number of disadvantages that make them unsuitable for the average domestic pond keeper. For example, they are extremely expensive and difficult to install into an existing pond. They require a larger installation area than other filtration systems in order to accommodate various external chambers that are required. They have inaccessible pipe joints in the pond base and walls, and gravity can draw the solid waste down into the drainage pipes under the pond, easier than it can draw the solid waste back up into external filter chambers. Solid waste in the filter drainage pipes is firstly difficult to remove, is secondly such that it restricts the water flow to the external filter chambers, and thirdly is such that it decays and pollutes the water quality.

It is an aim of the present invention to provide a filter for filtering water for a pump for an aquarium or a pond, which filter obviates or reduces the above mentioned problems.

Accordingly, the present invention provides a filter for filtering water for a pump for an aquarium or a pond, which filter comprises a housing, at least one inlet in the housing, at least one outlet in the housing, at least one filter member in the housing, at least one passageway in the housing, and at least one water flow control means;

the filter member having a body through which water to be filtered passes to the inside of the filter member, and a portion at which filtered water inside the filter member is able to pass to the outlet;

and the filter being characterised in that the water flow control means comprises at least one bypass inlet for controlling the water flow, the bypass inlet being such that it firstly controls the water flow direction and velocity as the water enters the bypass inlet, it secondly controls that water flow direction and velocity as the water leaves the bypass inlet, and it thirdly controls the water flow that bypasses the inlet; whereby the filter is such that, in use, the water enters the housing from the inlet at a controlled flow rate which does not attract already separated solids, whereby separated solids settle in the housing and filtered water passes through the filter member to the outlet.

The filter of the present invention is such that it may combine and supersede all of the advantages of existing mid-water, solid handling and bottom fed filtration systems. The filter of the present invention may be produced as a compact, easy to install and totally controllable filter. Still further, the filter can be used for filtering water from mid-water or the bottom of an aquarium or pond. This filtration can be effected simultaneously or separately. In addition, the filter may be produced to have no moving parts, which makes the filter reliable over prolonged periods of time.

The filter can be installed in any convenient, easily accessible position in any aquarium or pond, irrespective of whether the aquarium or pond is an existing one or a new one. The filter is easy to clean and maintain. If desired, the filter may be designed to be installed as a submersible filter or an external filter.

The filter may include at least one chamber, the chamber being characterised in that it comprises at least one water flow control aperture which firstly causes the water to change direction and velocity in order to leave the chamber, which secondly causes the water to change direction and velocity again as the water enters the passageway after having left the chamber, and which thirdly causes the water to change direction and velocity again as the water enters the housing having left the passageway.

The filter may be one in which the water flow control means is positioned adjacent the inlet and/or adjacent the outlet and/or in the housing.

Preferably, the filter is one in which the bypass inlet controls the water flow direction and/or velocity at least three times.

The filter may be one in which the chamber causes the water flow to change direction and/or velocity more than three times.

The bypass inlet may have adjustable flow control means.

The chamber may have adjustable flow control means.

The bypass inlet may have a plurality of apertures. The apertures may be in the form of holes and/or slots and/or nozzles. The apertures may be adjustable in size. The nozzles may extend inwardly and/or outwardly.

The filter may be one in which the portion of the filter member at which filtered water inside the filter member is able to pass to the outlet is formed by one end of the filter member.

The filter member may be movable and/or rotatable and/or changeable.

The housing may have at least one compartment for facilitating separation and/or filtration and/or for containing the pump.

The filter may include at least one valve for controlling the flow of water into and/or through the filter and/or leaving the filter and/or for preventing a backflow of water from the filter. The valve may have at least one flow control means.

The filter may include at least one cleaning device for cleaning the filter. The cleaning device may be fixed and/or movable and/or adjustable.

The filter may be one in which the housing has at least one opening for providing access to the inside of the housing.

The filter may be one in which the inlet and/or the outlet are constructed for receiving a manifold, whereby the water flow in the filter is able to be fed from a plurality of different inlets and/or fed through a plurality of different outlets during use of the filter.

The filter may be one which includes at least one flexible pipe for extending between at least one inlet and/or outlet and/or bypass inlet and a chosen place in the aquarium and/or pond, in order to facilitate separation and/or filtration and/or cleaning.

The filter may also include at least one sump for receiving the filtered waste.

The housing may have a rough or dimpled surface.

The filter may include at least one vent device for venting air in the filter. The filter may also include at least one drain-off device for draining the filter, for example as it is lifted from the water and/or for cleaning.

The filter may also include at least one ultraviolet lamp.

The filter may also include at least one venturi aeration valve.

The present invention also extends to a pump for an aquarium or a pond, the pump being provided with the filter of the present invention.

Embodiments of the invention will now be described solely by way of example and with reference to the accompanying drawings in which.

In the drawings, similar parts have been given the same reference numbers for ease of comparison and understanding. The illustrated filters may be produced in any suitable and appropriate size depending upon the size of the aquarium or pond which they are to service.

Figure 1:
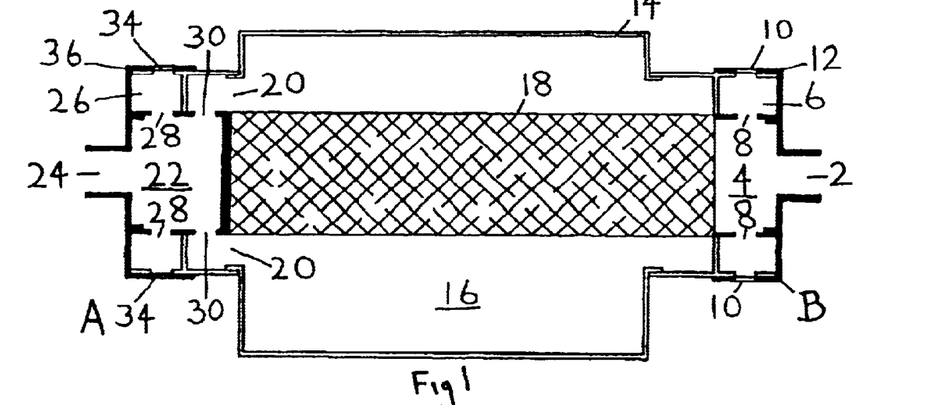
FIG. 1 shows a first filter for filtering water for a pump for an aquarium or a pond.
Figure 2:
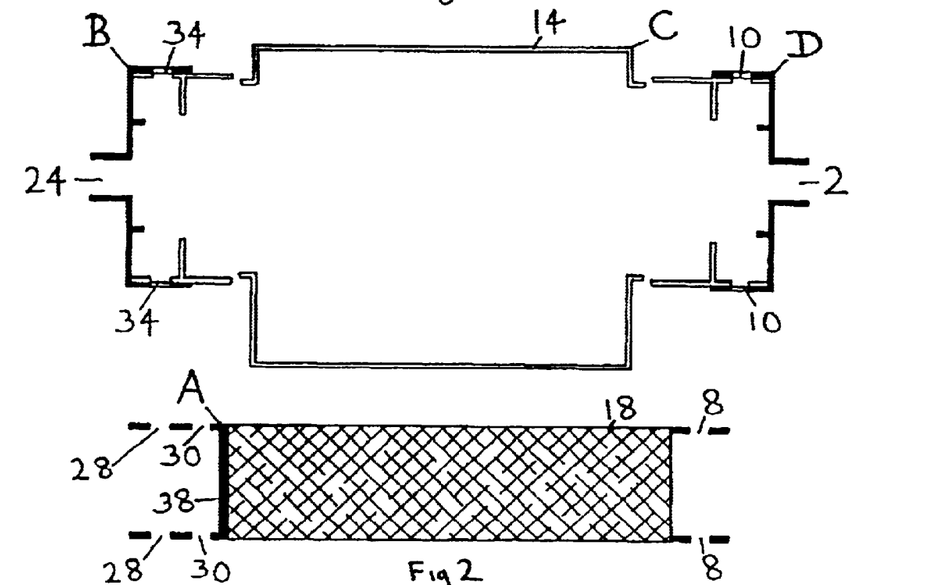
FIG. 2 is an exploded view of the filter of FIG. 1.

Referring to FIGS. 1 and 2, there is shown a filter for filtering water for a pump for an aquarium or a pond, which filter comprises a housing 14, at least one inlet in the housing 14, at least one outlet in the housing 14, at least one filter member 18 in the housing 14, at least one passageway in the housing 14, and at least one water flow control means;

the filter member 18 having a body through which water to be filtered passes to the inside of the filter member 18, and a portion at which filtered water inside the filter member 18 is able to pass to the outlet;

and the filter being characterised in that the water flow control means comprises at least one bypass inlet for controlling the water flow, the bypass inlet being such that it firstly controls the water flow direction and velocity as the water enters the bypass inlet, it secondly controls that water flow direction and velocity as the water leaves the bypass inlet, and it thirdly controls the water flow that bypasses the inlet; whereby the filter is such that, in use, the water enters the housing from the inlet at a controlled flow rate which does not attract already separated solids, whereby separated solids settle in the housing and filtered water passes through the filter member to the outlet.

As can be seen from FIG. 2, the end A of the filter member 18 is blocked at position 38. This end A forms a chamber when fitted inside the flow control fitting B. In an alternative type of filter of the present invention, this blocked end may be open or apertured. Two identical flow control end fittings are shown at B and D. The housing is shown as housing C.

As can best be appreciated from FIG. 1, the water enters the chamber 22 from inlet 24. Apertures 30 control the water flow as it leaves the chamber 22 and enters passageway 20. The passageway 20 controls the water flow into the housing, which forms an expansion and settlement chamber 16. Already separated heavier solid waste settles into the sump. Pre-filtered lighter suspended solid waste is carried by the reduced water flow to be filtered by filter member 18. The filtered water then enters chamber 4, then leaves chamber 4, and enters outlet 2.

The chamber 4 has adjustable bypass inlets 10 and a bypass chamber 6 which control the water flow that enters the chamber 4 through the apertures 8. This flow control controls the water flow that bypasses the filter housing by 0–100%, whilst simultaneously maintaining the water flow by 0–100% to the pump inlet. The chamber 22 has multiple inlet means comprising adjustable inlets 34 and/or inlet 24. The chamber 22 has the adjustable bypass inlets 34 and bypass chamber 26, which control the water flow that enters the chamber 22 through apertures 28.

A removable cap or plug may be fitted to the inlet 24. Water enters the chamber 22 by apertures 34 and/or the inlet 24. The apertures 34 may be used as mid-water inlets and/or as bypass inlets to bypass the flow at the inlet 24. The flow at the inlet 24 may be controlled and/or bypassed by the inlets 34. The flow at the inlet 24 and the inlets 34 may be controlled and/or bypassed by the bypass inlets 10.

The variable flow control of the filter increases filtration efficiency and enables any solid waste, from the heaviest solid waste to the lightest suspended solid waste, to be separated and filtered with maximum efficiency using both hydraulic and mechanical filtration.

Figure 3:
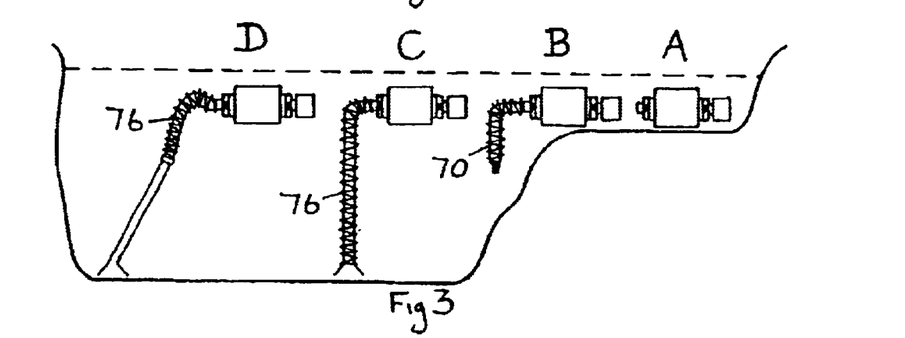
FIG. 3 shows how the filter of FIG. 2 can be used in four different ways in a pond.

FIG. 3 shows the filter of FIG. 2 in a pond and being used in four different ways which are identified as positions A, B, C, and D.

The filter in position A is such that the filter and pump are in an easily accessible position. In this position, the filter may use inlet 24 and/or inlets 34 to filter mid-water separately and/or simultaneously.

In position B, the filter is using a flexible hose 70 to filter from mid-water, using inlet 24. In another example, inlets 34 may be used to filter mid-water simultaneously.

In position C, the filter is using a filter hose 76 to filter from the pond bottom using inlet 24. In this position, the filter may use inlet 24 to filter from the bottom and inlets 34 to filter mid-water, separately and/or simultaneously.

In position D, the filter is using the flexible hose 76 and a vacuum attachment to vacuum waste from the pond using inlet 24. In another example, various submersible and/or external embodiments of this filter concept may be used as a portable water vacuum and/or filter.

Figure 4:
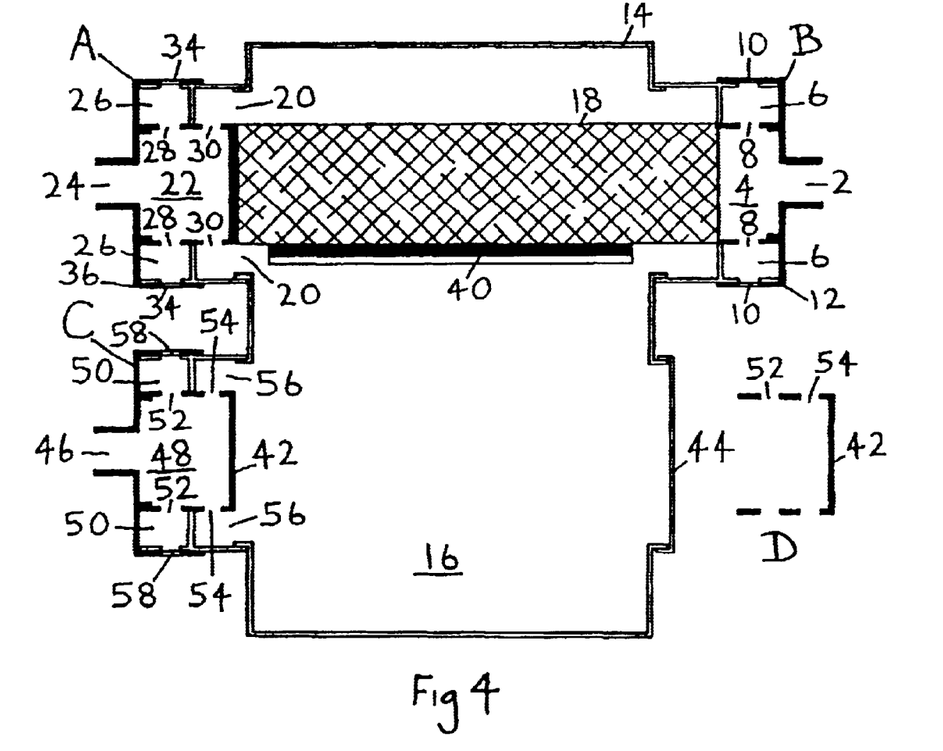
FIG. 4 shows a filter similar to FIG. 2 and with additional components.

FIG. 4 shows a filter similar to the filter shown in FIG. 2, but with additional second flow control inlet means C, a blank cap 44 and mechanical cleaning means 40. The filter flow control means A, B, and C are identical. C has insert 42 D, which is also the end A of the filter member 18 of FIG. 2. The additional second filter flow control inlet means C may be fitted to the other side of the housing. If required, an additional third flow control inlet means may be fitted to replace the blank cap 44.

Flow control inlet means A and B function the same as A and B of FIG. 1 above, but with the additional functions that water enters chamber 48 from inlet 46, and apertures 54 control the water flow as it leaves chamber 48 and enters passageway 56. Passageway 56 controls the water flow into the housing which forms an expansion and settlement chamber 16. Already separated heavier solid waste settles into the sump and prefiltered lighter suspended solid waste is carried by the reduced water flow to be filtered by filter member 18. The chamber 48 has a multiple inlet means using adjustable inlets 58 and/or inlet 46. The chamber 48 has adjustable bypass inlets 58 and bypass chamber 50, which control the water flow that enters chamber 48 through apertures 52. Inlet 46 may be fitted with a removable cap or plug. Water enters the chamber 48 by apertures 58 and/or inlet 46.

The flow at inlet 24 may be controlled and/or bypassed by the adjustable apertures 34.

The flow at inlet 24 may be controlled and/or bypassed by inlets 46, 58 and 10.

The flow at inlet 46 may be controlled and/or bypassed by the adjustable apertures 58.

The flow at inlet 46 may be controlled and/or bypassed by inlets 24, 34 and 10. In another example, the flow control apertures 30 and/or 54 and/or 8 may be adjustable and may control the flow at the various inlets and/or passageways.

The flow to the inlets 24, 34, 46 and 58 may be controlled and/or bypassed by bypass inlets 10 in outlet 2.

The five inlet means 10, 24, 34, 46 and 58 may be used on their own or in any combination as inlets and/or bypass inlets for increased filtration efficiency.

In order to clean the filter member with the filter in use, the bypass inlet apertures 10 are fully opened, which will bypass and/or stop the water flow in the filter housing and maintain 100% full flow to the pump inlet simultaneously. The filter member is rotated several times using end 12 or 36, which scrubs it against mechanical cleaning means 40. The removed solid waste settles into the sump position. To achieve hydraulic cleaning, the apertures 34 are fully opened and then, as the bypass inlets 10 are closed, passageway 20 directs the water flow along the filter member 18 to hydraulically clean it.

This filter embodiment may function as a vacuum using inlets 24 and/or 46 separately and/or simultaneously. Both flow control inlet means A and C may be used to filter mid-water and the bottom separately and/or simultaneously. This variable flow control increases the efficiency of the filter. Controlling the flow rate controls the separation, segregation, settlement and filtration of fluid and solid waste.

Figure 5:
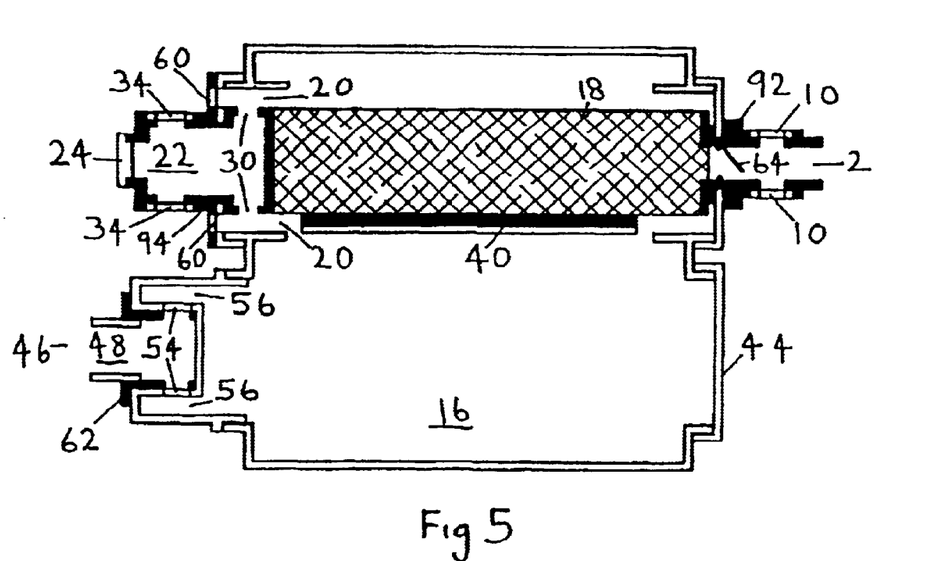
FIG. 5 shows another filter of the invention.

FIG. 5 shows a filter in which the water enters the chamber 48 from inlet 46. Adjustment means 62 controls adjustable apertures 54 which control the water flow as it leaves the chamber 48 and enters the passageway 56. The passageway 56 controls the water flow into expansion and settlement chamber 16. Already separated heavier solid waste settles into the sump, and prefiltered lighter suspended solid waste is filtered by filter member 18. The filtered water then enters outlet 2. The outlet 2 has bypass inlets 10 which control the water flow that bypasses the filter housing 0–100% while simultaneously maintaining the water flow by 0–100% to the pump inlet. The outlet 2 has flow control valve 64. Adjustment means 92 may be used to rotate the filter member 18 to clean it by mechanical cleaning means 40, which may be, by way of example, a scraper or brush to scrub the surface of filter member 18. The chamber 22 has a multiple inlet means using adjustable inlets 34 and/or inlet 24, and adjustable bypass inlets 60. Inlet 24 is shown fitted with a removable cap or plug. Water enters the chamber 22 by apertures 34 and/or inlet 24. Apertures 30 control the water flow as it leaves the chamber 22 and enters the passageway 20. The passageway 20 controls the water flow into the housing expansion and settlement chamber 16. As mentioned above, already separated solid waste settles into the sump and lighter prefiltered suspended solid waste is carried by the reduced water flow to be filtered through filter member 18 to the outlet 2. Adjustment means 94 may be used to rotate the filter member 18 to clean it on mechanical cleaning means 40.

The flow at inlet 46 may be controlled by the adjustable apertures 54.

The flow at inlet 46 may be controlled and/or bypassed by inlets 10, 24, 34 and 60.

The flow at inlet 24 may be controlled and/or bypassed by inlets 10, 34, 46 and 60. In another example, the flow control apertures 30 may be adjustable and control the flow from inlet 24 and/or inlets 34 into passageway 20.

The flow to the inlets 24, 34, 46 and 60 may be controlled and/or bypassed by bypass inlets 10 in outlet 2.

The five inlet means 10, 24, 34, 46 and 60 may be used on their own or in any combination as inlets and/or bypass inlets for increased filtration efficiency.

In order to clean the filter member with the filter in use, the bypass inlet apertures 10 are fully opened, which will bypass and/or stop the water flow in the filter housing and maintain 100% full flow to the pump inlet simultaneously. The filter member is rotated several times, which scrubs it against mechanical cleaning means 40. The removed solid waste quickly settles into the sump position. To achieve maximum hydraulic cleaning, the inlet 46 is firstly closed and then, as the bypass inlet 10 is closed, passageway 20 directs the water flow from at least one or a plurality of inlets 24 and/or 34 and/or 60 along the filter member 18 to hydraulically clean it.

When using the vacuum function with a flexible pipe from inlet 24, closing inlet 46 will increase the depth of sump available to contain filtered waste. The various inlets and/or bypass means may give any required partial or full flow control from 0–100% of the flow at inlet 24. Thus any solid waste from the heaviest solid waste to the lightest suspended solid waste can be separated and filtered.

When using the vacuum function with a flexible pipe from inlet 46, the various inlets and/or bypass means may give any required partial or full flow control from 0–100% of the flow at inlet 46. Thus any solid waste from the heaviest solid waste to the lightest suspended solid waste can be separated and filtered.

When vacuuming and/or filtering mid-water and the bottom simultaneously, the various inlets and/or bypass means may give any required partial or full flow control from 0–100% of the water flow at inlets 24 and 46 separately and/or simultaneously. Thus any solid waste from the heaviest solid waste to the lightest suspended solid waste can be separated and filtered with increased efficiency.

Figure 6:
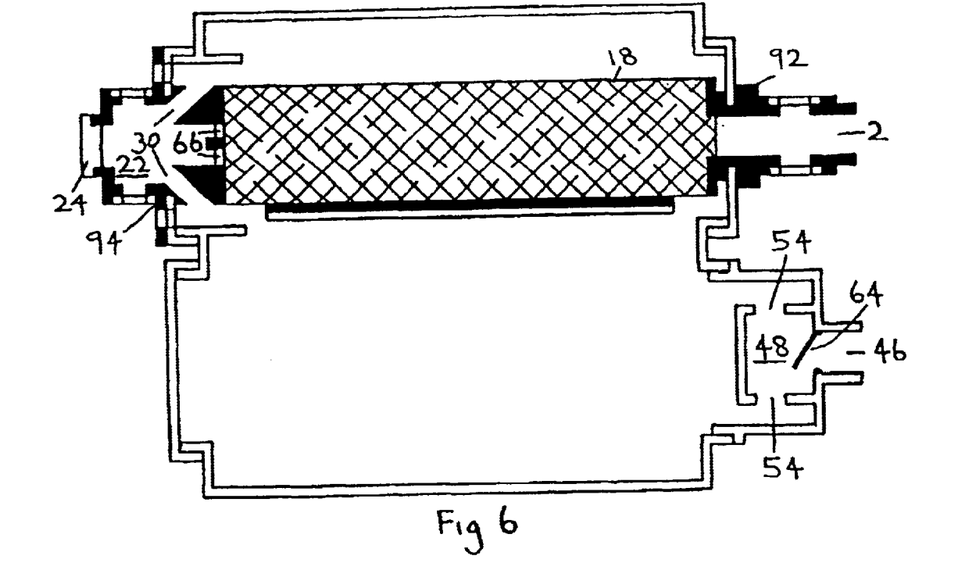
FIG. 6 shows a filter similar to the filter of FIG. 5 but with a flow control valve fitted in an inlet instead of an outlet as in FIG. 5.

FIG. 6 shows a filter similar to FIG. 5 but which has flow control valve 64 fitted in inlet 46 instead of outlet 2 in FIG. 5. Flow control apertures 54 are not adjustable as in FIG. 5. Flow control chamber 22 has adjustable apertures 66, adjusted by adjustment means 92 and/or 94 to control the water flow into filter member 18.

Figure 7:
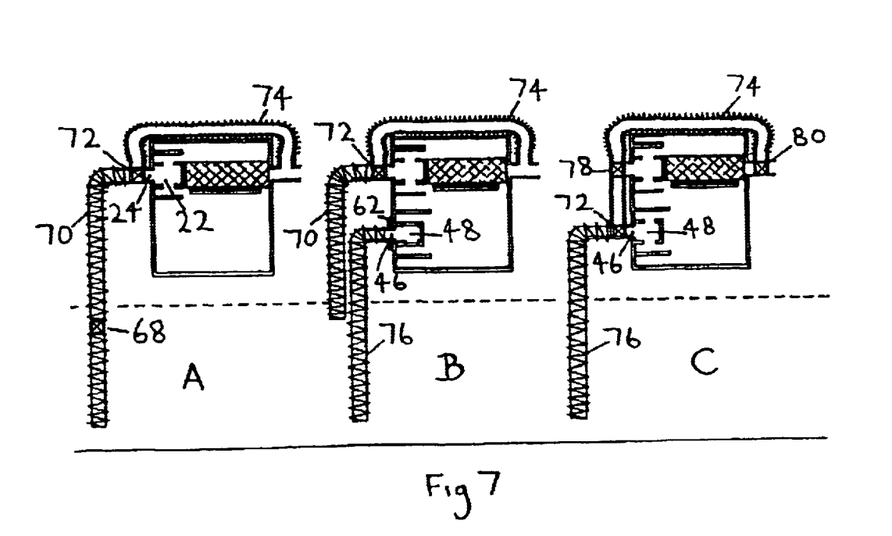
FIG. 7 shows three ways in which a filter of the invention can be used externally of an aquarium or a pond.

FIG. 7 shows by way of example three external embodiments in which multiple flow control fittings 72 and/or 78 may bypass the flow in the housing through bypass means 74, which is a flexible pipe. By other examples, bypass means 74 may be an adjacent compartment and/or a second filter member connected in parallel, which filter member may be used separately and/or simultaneously. The bypass means 74 enables these embodiments to clean the filter member and/or housing and/or housing contents during use with the pump working, to give increased filtration efficiency and to reduce maintenance and cleaning.

Embodiment A shows inlet pipe 70 having a water flow controlling multiple-bypass inlet fitting 68, which may control the water drawn from the bottom and/or mid-water separately and/or simultaneously. Inlet 24 has a multiple flow control fitting 72, which may at least firstly control the water flow as it enters the bypass means 74, secondly control the water flow as it enters the inlet 24, and thirdly control the water flow that bypasses the inlet 24. The multiple water flow control fitting 72 may control the water flow that bypasses the inlet 24 by 0–100%, while simultaneously maintaining 100% water flow to the pump inlet.

Embodiment B shows a filter similar to embodiment A without a flow controlling bypass fitting 68 in flexible pipe 70 but with the addition of the lower second inlet and separator 48 with adjustable apertures and adjustment means 62 and flexible pipe 76.

Embodiment C shows a filter similar to embodiment B without adjustable apertures on the lower inlet but with the addition of flow controlling bypass fitting 78 which controls the flow at the top inlet, and the flow that bypasses the bottom inlet separately and/or simultaneously. Also embodiment C has the addition of flow controlling bypass fitting 80 which controls the flow in the filter outlet and the flow that bypasses the filter housing separately and/or simultaneously.

Figure 8:
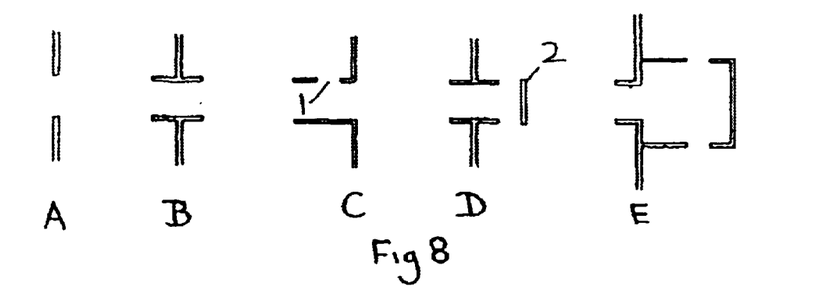
FIGS. 8, 9 and 10 show various constructions for various parts of a filter of the present invention.

Referring to FIG. 8:
A—shows a simple aperture which forms an inlet and/or bypass inlet;
B—shows a simple inlet and/or bypass inlet;
C—shows a simple inlet with a bypass inlet 1;
D—shows a simple inlet and/or bypass inlet with a baffle plate 2: in another example it may have a plurality of baffle plates to increase separation; and
E—shows an apertured separator chamber.

Figure 9:
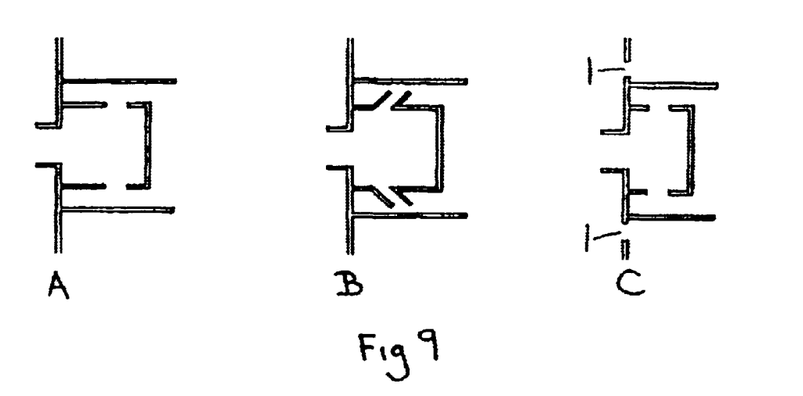

Referring to FIG. 9:
A—shows an apertured separator chamber and passageway;
B—shows an apertured separator chamber and passageway similar to A with the addition of tangental nozzles which may direct the water flow in a clockwise and/or anti-clockwise and/or any other required flow control direction to increase separation; and
C—shows an apertured separator chamber and passageway similar to A with the addition of bypass inlets 1.

Figure 10:
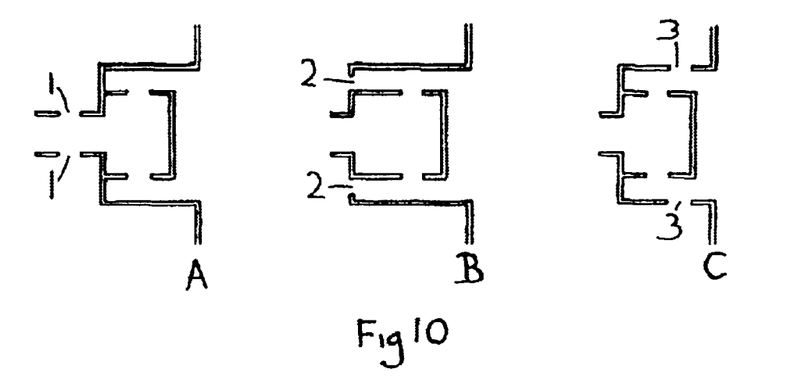

Referring to FIG. 10:
A—shows an apertured separator chamber and passageway with bypass inlets 1 fitted in the inlet;
B—shows an apertured separator chamber and passageway with bypass inlets 2 fitted in the axial passageway water flow; and
C—shows an apertured separator chamber and passageway with bypass inlets 3 fitted in the radial passageway water flow.

Figure 11:
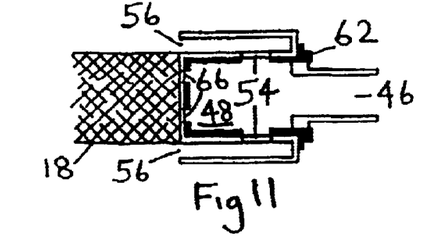
FIG. 11 shows a filter with a water flow controlling bypass inlet and separator means with adjustable apertures.

FIG. 11 shows the separator chamber 48 fitted adjacent one end of filter member 18. Apertures 66 and 54 may be adjusted separately and/or simultaneously by adjustment means 62. Apertures 54 control the water flow into passageway 56. Apertures 66 control the water flow into filter member 18. In another example, the apertures 66 may direct the water flow into the housing when the filter member is not attached as in FIG. 5 bottom inlet 46.

Figure 12:
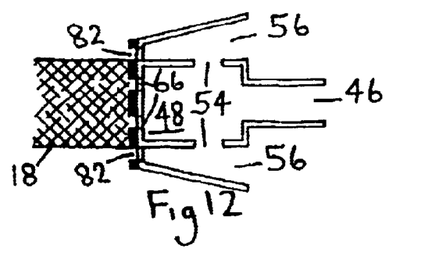
FIG. 12 shows a filter with an alternative design to that shown in FIG. 11, but still having water flow controlling bypass inlet and separator means with adjustable apertures.

FIG. 12 shows the separator chamber 48 and passageway 56, which gives a reverse direction of flow when apertures 66 and 82 are closed. Apertures 54 may be in another example adjustable. Apertures 54, 66 and 82 may be adjusted separately and/or simultaneously by any required adjustment means. Apertures 54 control the water flow into passageway 56. Apertures 82 control the water flow that bypasses the passageway 56 into the filter housing. Apertures 66 control the water flow into filter member 18.

Figure 13:
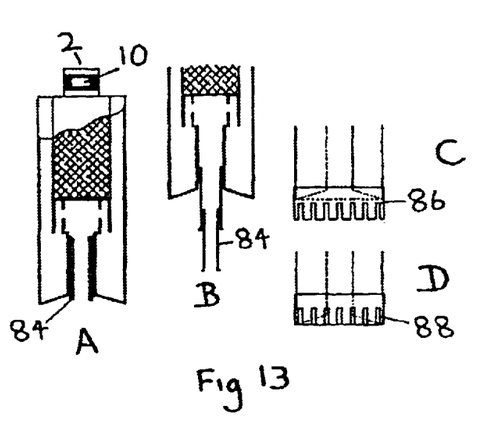
FIG. 13 shows a filter of the present invention and illustrates how various parts may be changed.

Referring to FIG. 13:
A—shows a filter of the present invention using the chamber and passageway B of FIG. 12 with extendable inlet 84;
B—shows the extendable inlet extended: this makes a portable hand held water vacuum and/or filter;
C and D—show an adjustable skirt or manifold that could be fitted to the bottom of this embodiment;
C—shows the adjustable skirt or manifold extended; and
D—shows the adjustable skirt or manifold retracted.

Figure 14:
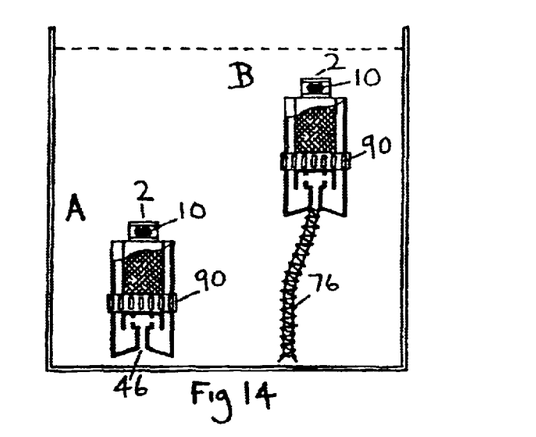
FIG. 14 shows a filter similar to that shown in FIG. 13 but without the extendable inlet and with a second inlet means.

FIG. 14 shows a filter similar to FIG. 13 without the extendable inlet and with a second inlet means 90.

A—shows the filter on the aquarium bottom, filtering the bottom through inlet 46 and mid-water through inlet 90. Mid water and/or the bottom may be filtered separately and/or simultaneously. The flow at inlet 46 may be controlled by the adjustable apertures 90. The flow at inlet 46 and inlets 90 may be controlled by the bypass inlet and/or inlets 10. The three inlets 10, 46 and 90 may be used on their own or in any combination as inlets and/or bypass inlets.

B—shows the filter at mid-water in the aquarium, filtering the bottom through inlet 46 using flexible pipe 76 and filtering mid-water through inlet 90. In another example, the flexible pipe 76 may include a vacuum attachment. Bypass inlet and/or inlets 10 in the outlet 2 give any required partial or full flow control from 0–100% of the flow that bypasses the filter, and simultaneously 100% maintain the flow to the powerhead inlet. This enables a venturi aeration valve to be fitted and controlled separately to the biological filter, which gives increased biological filtration.

Figure 15:
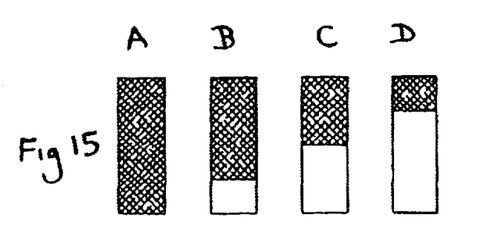
FIG. 15 shows four different types of filter member.

FIG. 15 shows four different embodiments of the filter member 18 in which:

A—shows 100% apertured;

B—shows 75% apertured;

C—shows 50% apertured; and

D—shows 25% apertured.

Controlling the apertured surface area controls the water velocity into filter member 18, and also controls the filtration efficiency, for example for mechanical and/or biological and/or chemical filtration.

Figure 16:
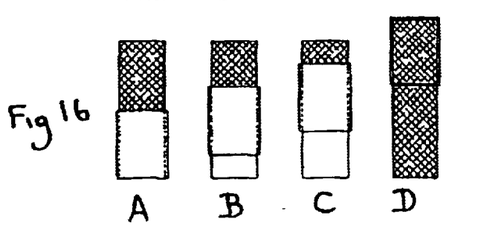
FIG. 16 shows four different types of filter member.

FIG. 16 shows four different embodiments of the filter member 18 in which:

A–C show three different positions of an adjustable filter member; and

D—shows an extendable filter member.

Figure 17:
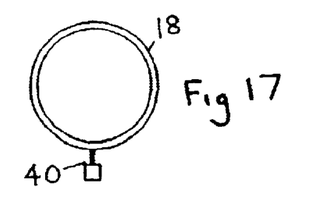
FIG. 17 shows a mechanical cleaning means.

FIG. 17 shows a mechanical cleaning means 40 which may be fixed or movable outside the filter member 18. The filter member 18 may be fixed or movable. The mechanical cleaning means 40 may be, by way of example, a brush and/or scraper with at least one mechanical cleaning means as shown or a plurality of mechanical cleaning means in a plurality of positions around the filter member 18. In another example, the mechanical cleaning means 40 may fit the outside of filter member 18 and clean the member as it moves along its length.

Figure 18:
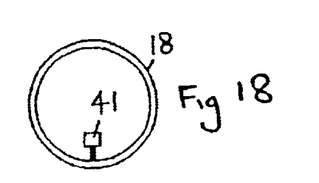
FIG. 18 shows another mechanical cleaning means.

FIG. 18 shows a mechanical cleaning means 41, which may be fixed or movable inside the filter member 18. The filter member 18 may be fixed or movable. The mechanical cleaning means 41 may be, by way of example, a brush and/or a scraper with a least one mechanical cleaning means as shown or a plurality of mechanical cleaning means in a plurality of positions around the inside of the filter member 18. In another example, the mechanical cleaning means may fit the inside of filter member 18 and clean the member as it moves along its length.

It is to be appreciated that the embodiments of the invention described above with reference to the accompanying drawings have been given by way of example only and that modifications may be effected.

What is claimed is:

1. A filter for filtering water for a pump for an aquarium or a pond, which filter comprises a housing, at least one inlet in the housing, at least one outlet in the housing, at least one filter member in the housing, at least one passageway in the housing, and at least one water flow control means;

the filter member having a body through which water to be filtered passes to the inside of the filter member, and a portion at which filtered water inside the filter member is able to pass to the outlet;

and the filter being characterised in that the water flow control means comprises at least one bypass inlet for controlling the water flow, the bypass inlet being such.

2. A filter according to claim 1 and including at least one chamber, the chamber being characterised in that it comprises at least one water flow control aperture which firstly causes the water to change direction and velocity in order to leave the chamber, which secondly causes the water to change direction and velocity again as the water enters the passageway after having left the chamber, and which thirdly causes the water to change direction and velocity again as the water enters the housing having left the passageway.

3. A filter according to claim 2 in which the apertures are in the form of holes and/or slots and/or nozzles.

4. A filter according to claim 1 in which the water flow control means is positioned adjacent the inlet and/or adjacent the outlet and/or in the housing.

5. A filter according to claim 1 in which the bypass inlet controls the water flow direction and/or velocity at least three times.

6. A filter according to claim 1 in which the bypass inlet has adjustable flow control means.

7. A filter according to claim 1 in which the chamber has adjustable flow control means.

8. A filter according to claim 1 in which the bypass inlet has a plurality of apertures.

9. A filter according to claim 8 in which the apertures are adjustable in size.

10. A filter according to claim 1 in which the portion of the filter member at which filtered water inside the filter member is able to pass to the outlet is formed by one end of the filter member.

11. A filter according to claim 1 in which the filter member is movable and/or rotatable and/or changeable.

12. A filter according to claim 1 in which the housing has at least one compartment for facilitating separation and/or filtration and/or for containing the pump.

13. A filter according to claim 1 and including at least one valve for controlling the flow of water into and/or through the filter and/or leaving the filter and/or for preventing a backflow of water from the filter.

14. A filter according to claim 1 and including at least one cleaning device for cleaning the filter.

15. A filter according to claim 1 in which the housing has at least one opening for providing access to the inside of the housing.

16. A filter according to claim 1 in which the inlet and/or the outlet are constructed for receiving a manifold, whereby the water flow in the filter is able to be fed from a plurality of different inlets and/or fed through a plurality of different outlets during use of the filter.

17. A filter according to claim 1 and including at least one sump for receiving the filtered waste.

18. A filter according to claim 1 and including at least one vent device for venting air in the filter.

* * * * *